United States Patent

Wells

[15] 3,697,858
[45] Oct. 10, 1972

[54] LINEAR SOLENOID AND INVERTER
[72] Inventor: Robert R. Wells, Anaheim, Calif.
[73] Assignee: Staco-Switch, Inc.
[22] Filed: Oct. 29, 1971
[21] Appl. No.: 193,931

[52] U.S. Cl. .....................321/18, 321/21, 321/45 R
[51] Int. Cl. ...............................................H02m 7/48
[58] Field of Search.............................321/21, 45, 18

[56] References Cited

UNITED STATES PATENTS

| | | | |
|---|---|---|---|
| 3,319,180 | 5/1967 | Mesenhimer | 321/45 R |
| 3,601,682 | 8/1971 | Iwata et al. | 321/45 R |
| 3,500,168 | 3/1970 | Merritt | 321/21 X |
| 3,366,867 | 1/1968 | Dodge | 321/45 R |
| 3,401,327 | 9/1968 | Leppert | 321/45 R X |
| 3,432,737 | 3/1969 | Hunter et al. | 321/45 R X |
| 3,475,675 | 10/1969 | Raposa | 321/21 X |

*Primary Examiner*—William M. Shoop, Jr.
*Attorney*—George F. Bethel et al.

[57] ABSTRACT

A resistive coupled transistored inverter for use with a solenoid providing a resistor-coupled feedback oscillator effect in an improved form wherein the improvement comprises a governing or control circuit in combination therewith. The governing or control circuit comprises a transistor and an appropriate voltage divider within the entire circuit to govern the periodicity of current oscillations in a uniform manner with respect to the back EMF and mechanical oscillations in the solenoid. The circuit is particularly accurate because it responds to the mechanical oscillations within the solenoid for purposes of matching the electrical current oscillation of the inverter with the natural mechanical oscillations of the moving elements of the solenoid.

9 Claims, 3 Drawing Figures

PATENTED OCT 10 1972　　　3,697,858

INVENTOR.
ROBERT R. WELLS
BY
GEORGE F. BETHEL
ATTORNEY

A LINEAR SOLENOID AND INVERTER

BACKGROUND OF THE INVENTION

1. Field of the Invention

The field of this invention lies within the electrical inverter art.

2. The Prior Art

The prior art relating to DC and AC electrical inverters incorporates transformer coupled inverters employing transistors. The transistors can be placed in common emitter circuits, common base circuits, common collector circuits, auto-transformer circuits, as well as push pull relationship and other forms. One particular inverter known in the art incorporates a resistive-coupled transistored inverter circuit.

The specific resistive-coupled inverter of this invention obtains an output somewhat approximating a deformed type of square wave. The output or drive is obtained by cross-coupled resistor feedback applied to the base of the respective transistors. In this type of circuit, a substantial degree of loss has been incorporated in the resistor coupled to the primary winding.

There are also other drawbacks of the resistive-coupled transistored inverter. However, in many respects it is a highly desirable inverter which has not been capable of effective use until this time.

Specifically, resistive-coupled transistorized inverters are difficult to control with regard to the frequency of the wave form which is generated therefrom. The frequency is subject to large deviations such that when a constant output is required, the circuit is not able to provide it.

This particular invention overcomes the prior art deficiencies with respect to resistive coupled transistor inverters, particularly with respect to consistency of frequency. Oftentimes, the only control of frequency is accomplished by controlling variable capacitors or inductors. In other words, after a specific circuit has been designed, a connection is made to a specified power supply and a solenoid to be driven. After the power supply has been connected, the inverter characteristics are then adjusted by changing the capacitance or inductance characteristics of the circuit.

It has been found that this invention overcomes the foregoing deficiencies of the prior art, specifically with regard to frequency control of inverter circuits. The inverter circuits of this invention allow for frequency control within certain prescribed norms. As long as the system is not substantially overdriven, the frequency of the current inversion will substantially match the mechanical elements of the solenoid which is driven.

The inverter circuit of this invention can be utilized with an inductive load which has a mechanical device with a natural frequency. Specifically, the mechanical device can be a spring of a finite resonant device such as a linear solenoid, audio alarm, or other device which has a given mechanical frequency. In the specific embodiment of this invention initially, the invertor has found that it is quite advantageous to use the inverter control circuit with a swing motor. As will be described, a swing motor is in effect a linear solenoid which is spring mounted and driven at its natural frequency to impart a mechanical drive to a specific mechanical load. This invention substantially upgrades the quality control of such swing motors.

SUMMARY OF THE INVENTION

In summation, this invention is an improved frequency control for a resistive-coupled transistored inverter.

More particularly, the invention causes the resistive coupled transistors of the circuit to turn on and off in response to a particular mechanical frequency of a driven device. This is accomplished at an instant of time when a mechanical function periodically occurs. The back EMF at that instant of time by means of a transistor control element of the circuit causes one of the respective resistive-coupled transistors to turn off and the other to turn on in response to the natural mechanical frequency of the load being driven. This specific control function is a substantial improvement over the prior art and makes this invention extremely attractive for use as an inverter with a linear solenoid having a natural mechanical frequency.

DESCRIPTION OF THE PREFERRED EMBODIMENTS

Figure 1:
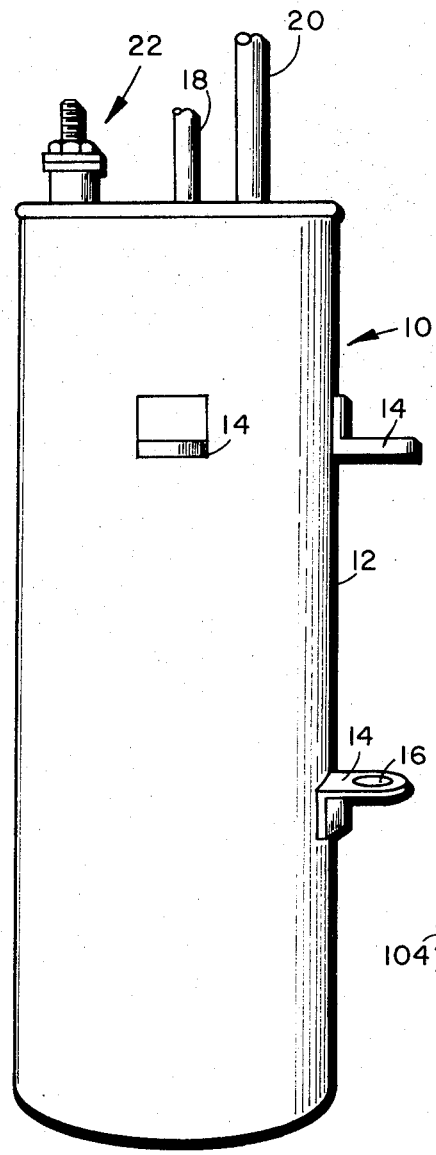
FIG. 1 shows an elevation view of the swing motor which can be used in this invention.

In order to fully understand the invention with respect to a solenoid having a finite resonant point, a particular solenoid will be described. Specifically, a swing motor for pumping refrigerant generally shown at 10 falls into the category of a finite resonant point solenoid which can use the inverter of this invention.

The swing motor can be generally characterized as having most of the functions of linear solenoids. The swing motor 10 has a casing 12 with appropriate mounting brackets 14 having openings 16 therein for mounting the swing motor to an apparatus which it is to be utilized with. The swing motor 10 has input and output lines 18 and 20 which can be utilized for the pumping of refrigerant. A terminal 22 is shown with the swing motor for purposes of electrically connecting the swing motor to an inverter circuit.

The internal portion of the swing motor comprises a coil 24 supported by a swing 26. A gap 28 exists in surrounding relationship to the coil 24. The coil 24 is suspended sufficiently by the springs so that it can move in a vertically oriented relationship with respect to the showing of the figures.

A yoke 30 is shown overriding the coil 24 and a permanent magnet 32 surrounded partially thereby. A pole piece 34 is shown in underlying relationship to the permanent magnet 32.

A piston 36 is connected to the coil 24 for moving relationship therewith. The piston 36 is inserted in a cylinder 38 which allows the piston and coil to move back and forth without contacting the yoke 30 or the pole piece 34. This is accomplished by virtue of the fact that a gap 28 exists in the space between the yoke 30 and the coil 24.

The coil 24 is connected to an alternating source of electrical power, the piston 38 and the coil move in an oscillatory manner at the rate of the alternation of the current. An intake valve 42 and an outlet valve or exhaust valve 44 is provided to allow the piston 36 to open and close the valves. The foregoing action effectively creates a pump which compresses the gas for a refrigerator system.

It should be noted that the swing motor operates in simple analogy to a common magnetic speaker. For instance, a permanent magnet in a speaker creates a strong magnetic field in the ring gap formed between a yoke and a pole piece in analogy to the above described swing motor. The coil is suspended in the space and attached to the paper cone. The coil of the swing motor is attached to a piston 36 of the swing motor which is similar to the cone or speaker. When an accoustic or alternating current is fed to the coil of a speaker, it causes the coil to vibrate in the magnetic field and drive the paper cone to produce a sound. The principle of the swing motor is similar to this inasmuch as the coil 24 serves to drive the piston 36 and create a pumping action with the valves 42 and 44.

The weight of the coil 24 and the strength of the spring 26 is calculated to place the mechanical resonance of the system at a particular frequency of the power source to achieve high efficiency. However, the design of the system for achieving a mechanical frequency within certain periodicities is limited. As a consequence each particular swing motor will vary within certain ranges of frequency even though they are manufactured in the same line. Of course, this stems from different characteristics of metal resiliency, weight, and degrees of tolerance in the manufacturing process.

As a consequence, each swing motor 10 and for that matter each linear solenoid of other systems has a natural given frequency which varies with respect to other similar types of swing motors or linear solenoids. It has been found that this invention compensates for the foregoing variances within certain norms and allows them to operate at a substantially higher efficiency than is normally available.

As can be appreciated, the signal or power supplied to the swing motor 10 has to be of an alternating nature, and should be relatively consistent as to its periodicity in order to take advantage of the natural resonance of the swing motor. The particular inverter of this invention shown in FIGS. 2 and 3 serves to perform this function.

Figure 2:
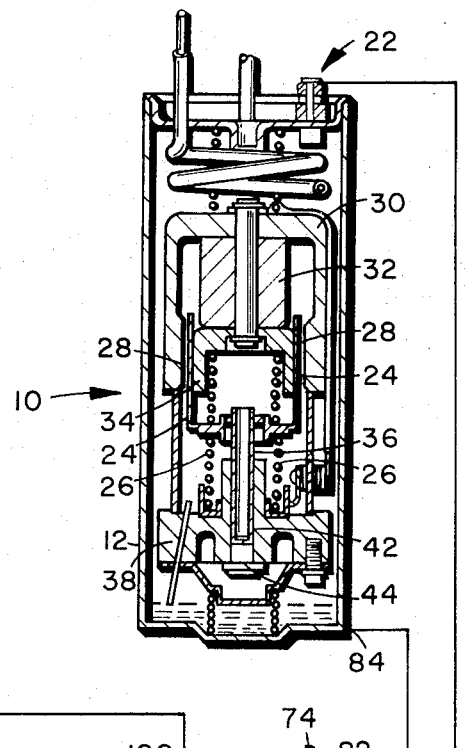
FIG. 2 shows a resistive-coupled transistored inverter connected to a swing motor which has been sectioned through the middle thereof for expository purposes; and, FIG. 3 shows the control circuit of this invention which has been broken out but is utilized with the circuit shown in FIG. 2.
Figure 3:
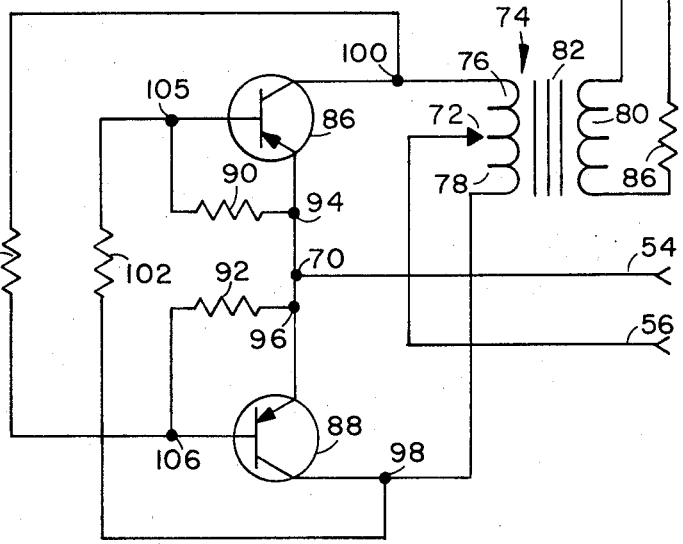
Figure 3:
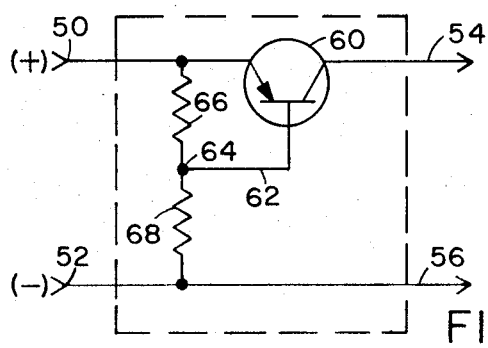

A schematic view as shown in FIGS. 2 and 3 has the following components connected in the following manner. Specifically, a source of DC power is supplied to terminals at a plus side 50 and a negative side 52. As shown, the power source is connected to the portion of this invention, isolated in FIG. 3. However, it should be understood that the circuit of FIG. 3 is connected to the circuit of FIG. 2 and has only been broken out for expository purposes. In actual practice, the circuit of FIG. 3 is connected so that line 54 of FIG. 3 is a continuation of line 54 in FIG. 2. At the points of connection, the two circuits are interfaced and operate within the entire system as an integral circuit connected to the respective points 50 and 52 of the power source.

The circuit of FIG. 2 is generally that of a known resistive-coupled transistored inverter. Specifically, the resistive-coupled transistored inverter provides a deformed square wave from its transistor output by cross-coupled resistor feedback. However, as previously stated, the resistor coupled feedback inverter which is in effect an oscillator is somewhat inefficient. This is due to the losses in the resistor coupled to the low side of the primary winding. Furthermore, it has been found that the control of the frequency, as previously stated of the circuit shown in FIG. 2 is extremely difficult. As a consequence this invention for the control of such an inverter circuit is particularly advantageous.

In use, the power source across lines 50 and 52 is connected firstly to the emitter of transistor 60 with the base connected to a line 62. Line 62 is connected to a voltage divider at point 64, comprising a 47 ohm resistor 66 and a 75 ohm resistor 68. The transistor 60 is a BD 3030 transistor.

The lines 54 and 56 respectively from the collector and negative side of the power source are respectively connected to the circuit of FIG. 2 at point 70 and a center tap 72 of primary coil 74. The primary coil 74 comprises a high side series of windings 76 of 41 turns, and a low side series of windings of 41 turns. The primary coil 74 is magnetically linked by a core 82 of ferromagnetic material to a second coil 80 having 86 turns. The coil 80 delivers alternating current which has been inverted from direct current to the swing motor 10 at terminals 22 and 84. In order to prevent overloads on the system a damping resistor 86 is provided of 1-½ ohms.

Basically, the inverter is of the push pull type having transistors 86 and 88 functioning so that when one is going positive the other is going negative. Transistors 86 and 88 are each respectively BD 3030 transistors and are biased at their bases by respective biasing resistors 90 and 92 having values of 15 ohms each. The biasing resistors 90 and 92 are connected to a common emitter line at respective points 94 and 96.

Transistors 86 and 88 can also be heavy duty transistors, such as those made of germanium and classified as 2N2527 power transistors manufactured by Motorola Semiconductor Products, Phoenix, Ariz. The use of the foregoing BB3030 transistors and the 2SN2527 transistors does not require a suppression of the reverse EMF that drives the circuit as will be explained, because the transistors do not "burn out" during operation of the device. However, it has been found that cheaper transistors can be utilized in the operation of the invention by the utilization of diodes placed between junctions 100 and 94 and junctions 96 and 98 to shunt or suppress the back EMF from the transistors 86 and 88. The cheaper transistors do not effectuate the operation of the device to any appreciable degree when used in connection with current suppressors, such as a capacitor or the diodes. When suppression is used, such as diodes between the collector-emitter junction, the only advantage obtained is the fact that cheaper transistors can be utilized.

The low end 78 of the primary coil 74 is connected at its low side to the collector of transistor 88 and to the base of transistor 86 through point 98. The upper side of the coil 76 is connected to the collector of transistor 86 and the base of transistor 88 through point 100.

Resistors 102 and 104 provide a resistive coupling having values respectively of 75 ohms each. Resistor 102 is connected to junction point 98 and to the base of transistor 86 at junction point 105. Resistor 104 is connected to the base of resistor point 100 through junction point 106 and to the collector of transistor 86 through junction point 100.

In operation, it is thought that the swing motor provides a back EMF pulse. The pulse is fed back to the source and controls the push pull operation of transistors 86 and 88. The physical movement of the piston 36 or for that matter, any linear solenoid has a certain point at which such physical movement stops in one direction. After stopping, or at the dead point, the physical movement reverses and the solenoid piston moves in the opposite direction. It is at this point when movement is reversed, that the control point for proper inverter operation should be effectuated with respect to an oscillating current. In other words, the linear solenoid has a specific mechanical frequency in which it operates over an extended range. It is this mechanical frequency which has to be taken into account when an inverter provides an alternating current to match the mechanical frequency.

It is thought that when the swing motor or a linear solenoid reaches a finite resonant end point, that the inductive load of the field in which the inductive load operates collapses. In other words, the inductive load or field collapses at the finite end point at which the alternating resonance of the mechanical device ceases and returns in the other direction. It is at this point that a back EMF is then shaped and reflected back to the source.

As the back EMF changes the bias on transistor 60 it causes it to shut off momentarily. The cessation of current causes a collapse on the primary winding 74 which in effect switches the transistors 86 and 88 from an on to an off position respectively or vice versa depending upon what state they were in prior to the collapse of the field.

In essence, the circuit of FIG. 3 operates as a governor for creating a driving alternating current that is consonant with the mechanical resonance of a linear solenoid that is being driven by the alternating current. Stated another way, the control function of transistor 60 is such that it matches the mechanical system to the electrical system by incorporating the reflection of the back EMF as a governing function at the point of the oscillatory return during each mechanical movement of the linear solenoid at its limits.

Although the inventor has described an exact embodiment for purposes of teaching this invention, it should be understood that other alternative embodiments incorporating the teachings hereof can be utilized. Specifically, equivalents insofar as circuits and control functions of the circuit of FIG. 3 in conjunction with an inverter other than the type shown in FIG. 2 can be utilized in push pull operation to enhance the operating features of a linear solenoid as it relates to its specific mechanical resonance.

What is claimed is:

1. A linear solenoid in combination with a current inverter for providing an alternating current from a source of direct current to the linear solenoid to be driven by the alternating current comprising:
    a linear solenoid which has a spring biasing means creating a mechanical resonance of the solenoid in response to the alternations of current delivered thereto;
    a push pull, transformer-coupled transistor oscillator circuit for connection to said solenoid having the oscillation thereof controlled by the back EMF of said linear solenoid; and,
    a control means connected across the primary of said transformer, and to the transistors operating in push pull relationship.

2. The circuit as claimed in claim 1 wherein:
    said control means is a transistor connected between said transistors operating in push pull relationship.

3. The circuit as claimed in claim 2 wherein:
    the base of said control transistor is connected between a first and second resistor acting as a voltage divider across the DC voltage source.

4. The circuit as claimed in claim 3 wherein:
    said oscillator circuit has two transistors operating in push pull relationship with the bases of each transistor respectively coupled to the other transistor's emitter.

5. The circuit as claimed in claim 3 further comprising:
    said oscillator circuit has two transistors operating in push pull relationship with the bases of each transistor respectively coupled to the other transistor's collector.

6. The circuit as claimed in claim 5 wherein:
    the emitters of the transistors are resistor biased.

7. The circuit as claimed in claim 6 wherein:
    the primary of said coupling transformer is center tapped and connected to the voltage supply.

8. The new and novel combination of a linear solenoid device and an inverter circuit for supplying alternating current thereto from a direct current source comprising:
    a linear solenoid device having a natural mechanical frequency at which the moving mechanical elements thereof oscillate, provided by spring biasing means and the mass of the moving elements thereof;
    a push pull transformer-coupled transistorized oscillator circuit having the secondary of the transformer connected to the linear solenoid for powering said linear solenoid; and,
    transistor means interfacing a DC power supply and said transformer-coupled transistorized oscillator for purposes of turning the respective transistors of the inverter circuit on and off with respect to the movement of the mechanical elements of the linear solenoid as it reflects back EMF to the circuit through the transformer.

9. The combination as claimed in claim 8 further comprising:
    mechanical pumping means driven by said linear solenoid.

* * * * *